United States Patent
Chauvette

(10) Patent No.: US 11,724,285 B2
(45) Date of Patent: Aug. 15, 2023

(54) MECHANICAL AMPLIFICATION OF PIEZOELECTRIC ACTUATORS

(71) Applicant: Boréas Technologies Inc., Bromont (CA)

(72) Inventor: Guillaume Chauvette, Bromont (CA)

(73) Assignee: Boréas Technologies Inc., Bromont (CA)

( * ) Notice: Subject to any disclaimer, the term of this patent is extended or adjusted under 35 U.S.C. 154(b) by 234 days.

(21) Appl. No.: 17/165,982

(22) Filed: Feb. 3, 2021

(65) Prior Publication Data

US 2021/0283657 A1  Sep. 16, 2021

Related U.S. Application Data

(60) Provisional application No. 62/706,026, filed on Jul. 28, 2020, provisional application No. 62/988,418, filed on Mar. 12, 2020.

(51) Int. Cl.
| | |
|---|---|
| *B06B 1/14* | (2006.01) |
| *H04B 1/034* | (2006.01) |
| *G06F 3/01* | (2006.01) |
| *B06B 1/06* | (2006.01) |

(52) U.S. Cl.
CPC .............. *B06B 1/14* (2013.01); *B06B 1/0644* (2013.01); *G06F 3/017* (2013.01); *H04B 1/034* (2013.01)

(58) Field of Classification Search
CPC ......... B06B 1/14; B06B 1/0644; G06F 3/017; G06F 3/016; H04B 1/034
See application file for complete search history.

(56) References Cited

U.S. PATENT DOCUMENTS

| | | | |
|---|---|---|---|
| 11,024,793 B1 | 6/2021 | Chaput et al. | |
| 2017/0168462 A1* | 6/2017 | Ryu | G04G 17/02 |
| 2018/0356889 A1 | 12/2018 | Khoshkava et al. | |
| 2019/0384399 A1 | 12/2019 | Forest et al. | |
| 2020/0098967 A1 | 3/2020 | Chaput et al. | |
| 2021/0026450 A1* | 1/2021 | Fu | G04G 17/04 |
| 2021/0031235 A1* | 2/2021 | Neuwirth | H01L 41/0906 |

OTHER PUBLICATIONS

International Search Report for corresponding PCT application No. PCT/CA2021/050241.

* cited by examiner

*Primary Examiner* — Grant Sitta
(74) *Attorney, Agent, or Firm* — Stratford Group Ltd.

(57) ABSTRACT

Typically, the displacement of piezo-electric actuators is quite small. Accordingly, some sort of amplification may be needed for specific applications to amplify the displacement of the piezo-electric actuator, and thereby amplify the haptic feedback. For all solutions, the goal is to amplify the displacement of a moveable mass in order to increase vibration to improve the haptic feedback. If the host device is a wearable or portable device, e.g. a smart watch, it would be preferable to excite a heavy moveable mass that is already part of the assembly to harvest enough energy to transmit to the interface with the user. If the device is a large display, e.g. a display in a vehicle info system, the display itself could be the moveable mass.

16 Claims, 21 Drawing Sheets

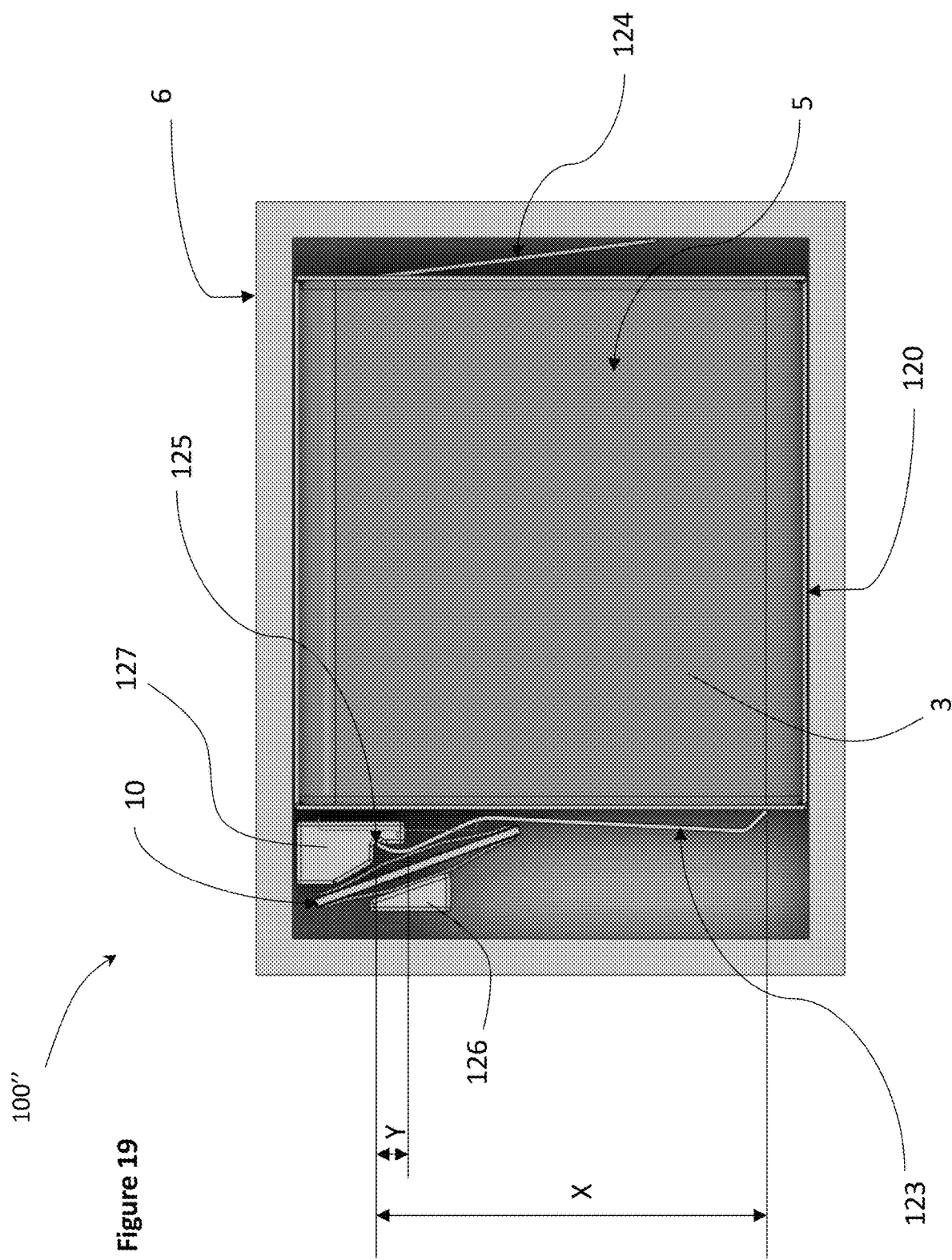

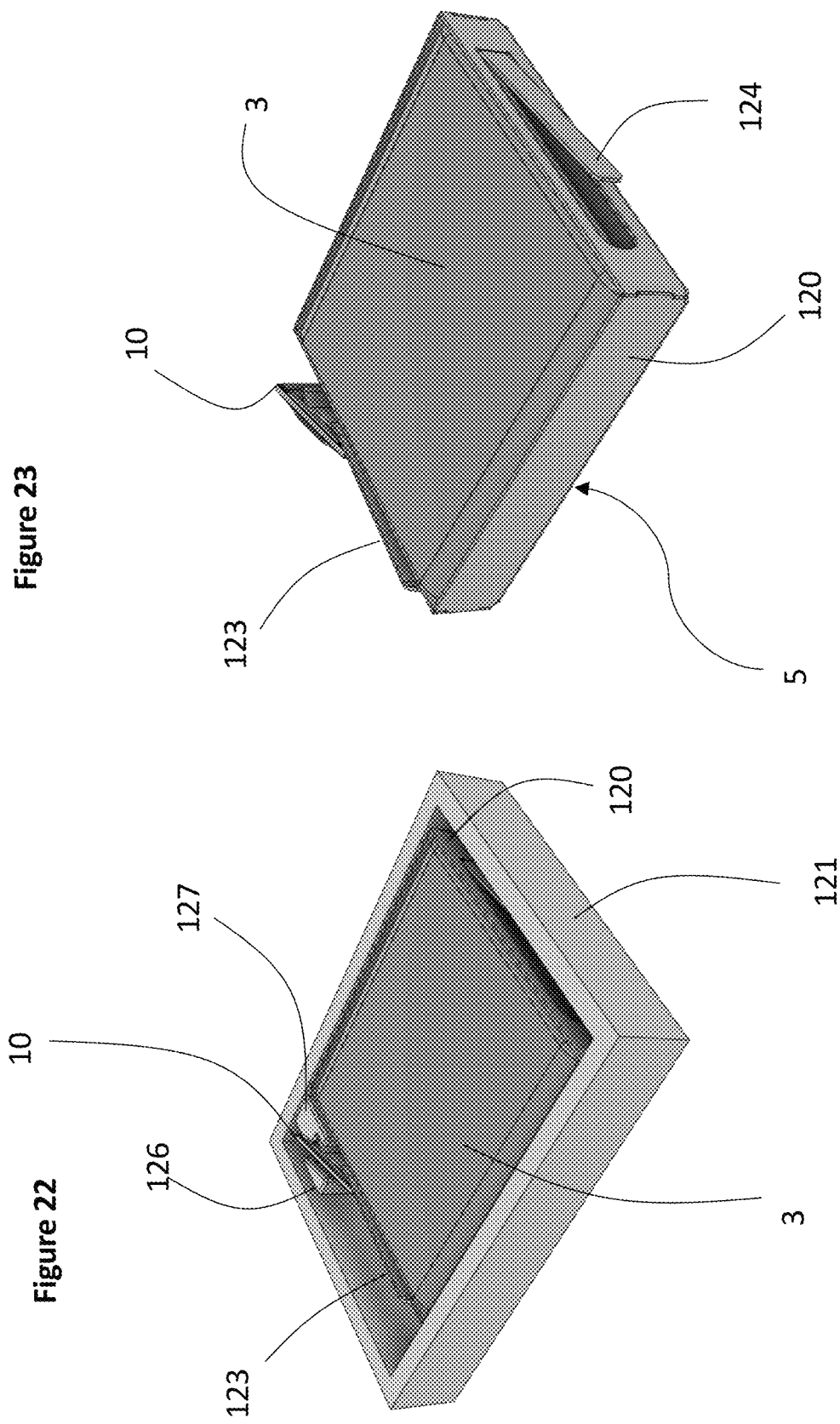

MECHANICAL AMPLIFICATION OF PIEZOELECTRIC ACTUATORS

CROSS-REFERENCE TO RELATED APPLICATIONS

This application claims the benefit of U.S. Provisional Patent Applications Nos. 62/988,418 filed Mar. 12, 2020, and 62/706,026 field Jul. 28, 2020, which are incorporated herein by reference.

TECHNICAL FIELD

The present disclosure relates to a mechanical amplifier, and in particular to a mechanical amplification element used to replace a linear resonant actuator (LRA) or an eccentric rotating mass (ERM) motor in a system using a piezo-electric actuator, such as in mobile devices, wearable devices and displays.

BACKGROUND

Small and lower-power piezo-electric circuits are disclosed in United States Patents Publication No. 2020/0098967, published Mar. 26, 2020, in the name of Chaput et al, and U.S. patent application Ser. No. 15/929,890 filed May 28, 2020 in the name of Chaput.

However, since the displacement of piezo-electric actuators is quite small, some sort of amplification may be needed for specific applications to amplify the displacement of the piezo-electric actuator, and by consequence, amplify the haptic feedback.

SUMMARY

Accordingly, a first apparatus includes a device comprising:
  a housing;
  a display for displaying information and/or a transmitter for transmitting signals;
  a PCB for controlling the display and/or the transmitter;
  a battery for powering the PCB;
  a piezoelectric actuator configured to provide a haptic response; and
  a mechanical amplifier between the housing and a moveable mass for mechanically amplifying the haptic response from the piezoelectric actuator to a user,
  wherein the moveable mass is configured to move within the housing to provide an amplified haptic response to the user.

BRIEF DESCRIPTION OF THE DRAWINGS

Some example embodiments will be described in greater detail with reference to the accompanying drawings, wherein:

FIG. 19 is a top view of another example embodiment of the present disclosure;
FIG. 22 is a perspective view of the device of FIG. 19;
and
FIG. 23 is a perspective view of the mechanical amplifier of the device of FIG. 19.

DETAILED DESCRIPTION

Figure 1:
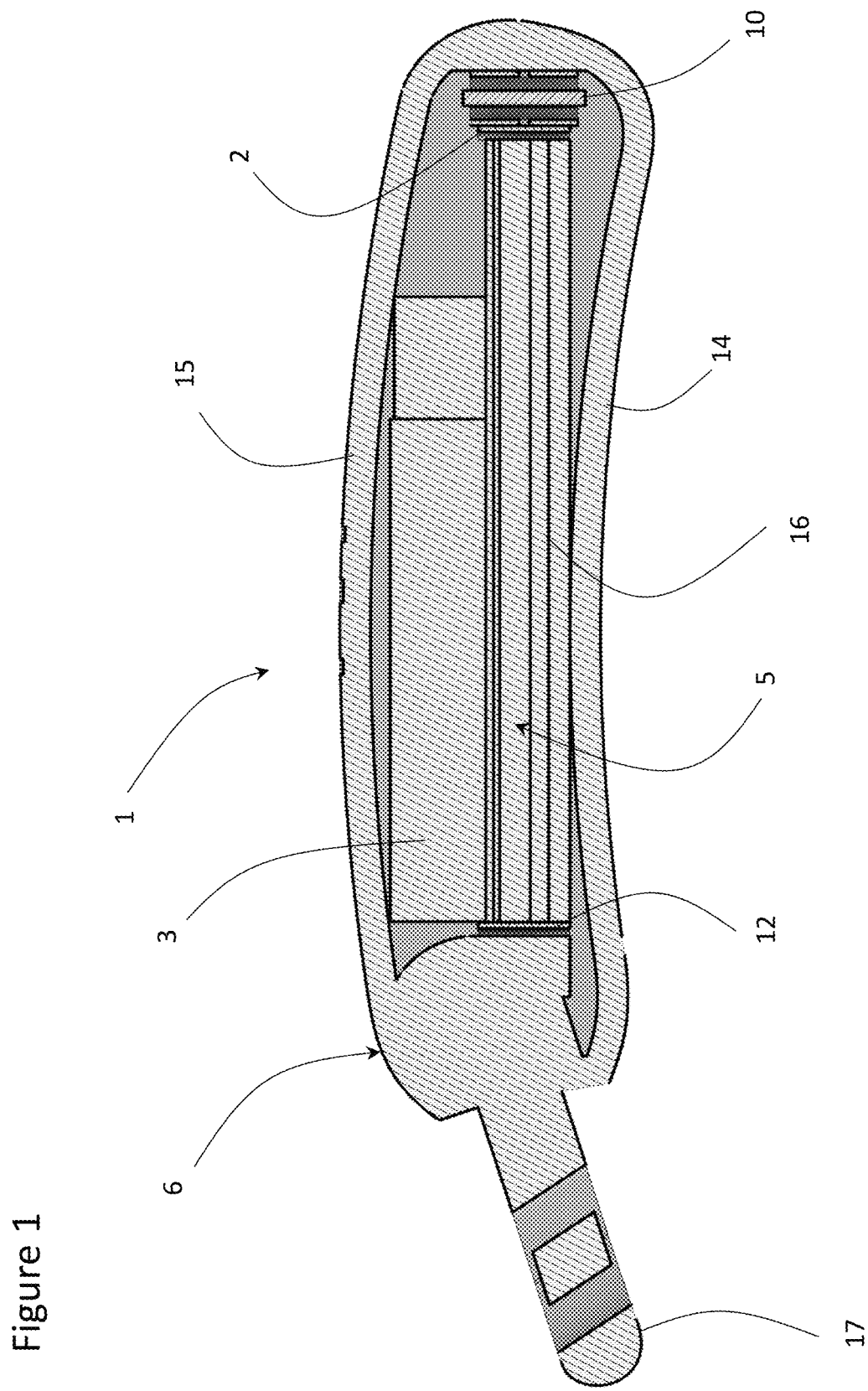
FIG. 1 is an cross-sectional view in accordance with an example embodiment of the present disclosure.
Figure 2:
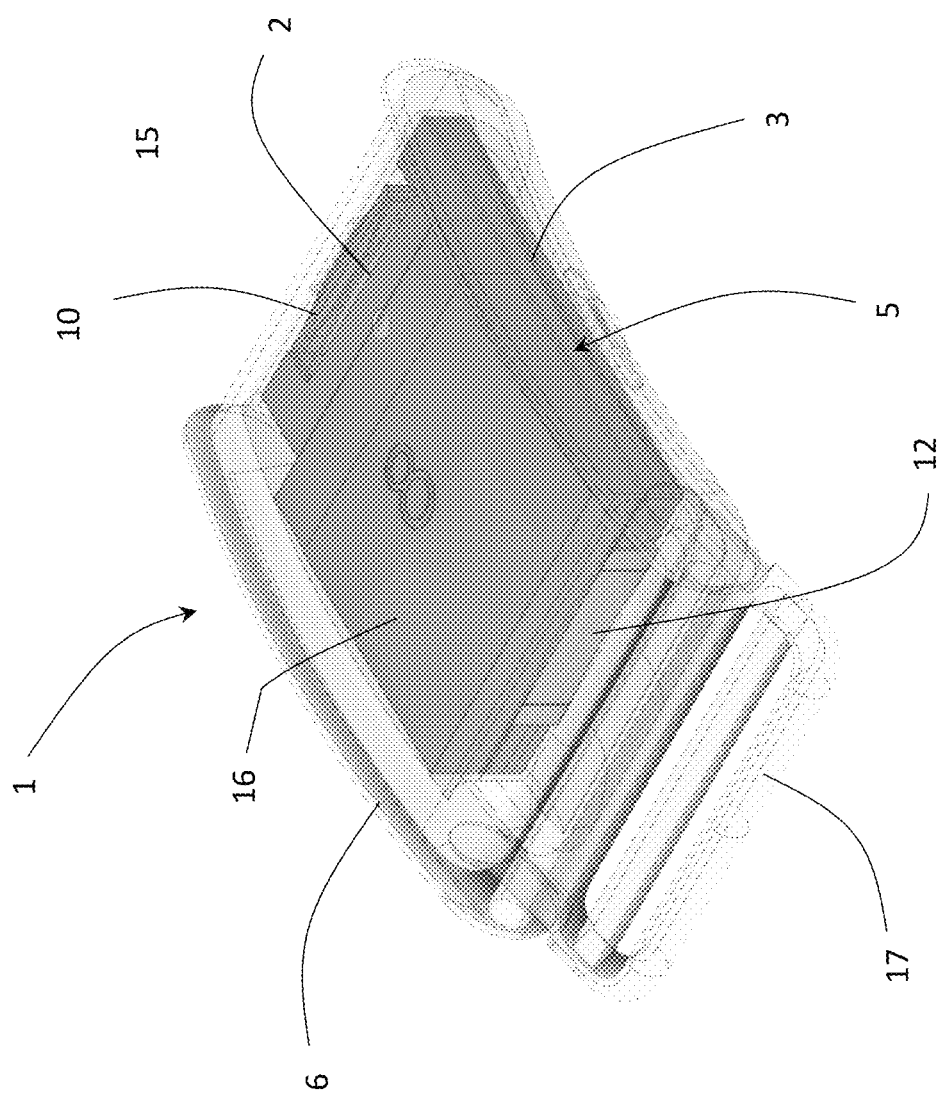
FIG. 2 is a perspective view of the device of FIG. 1.
Figure 3:
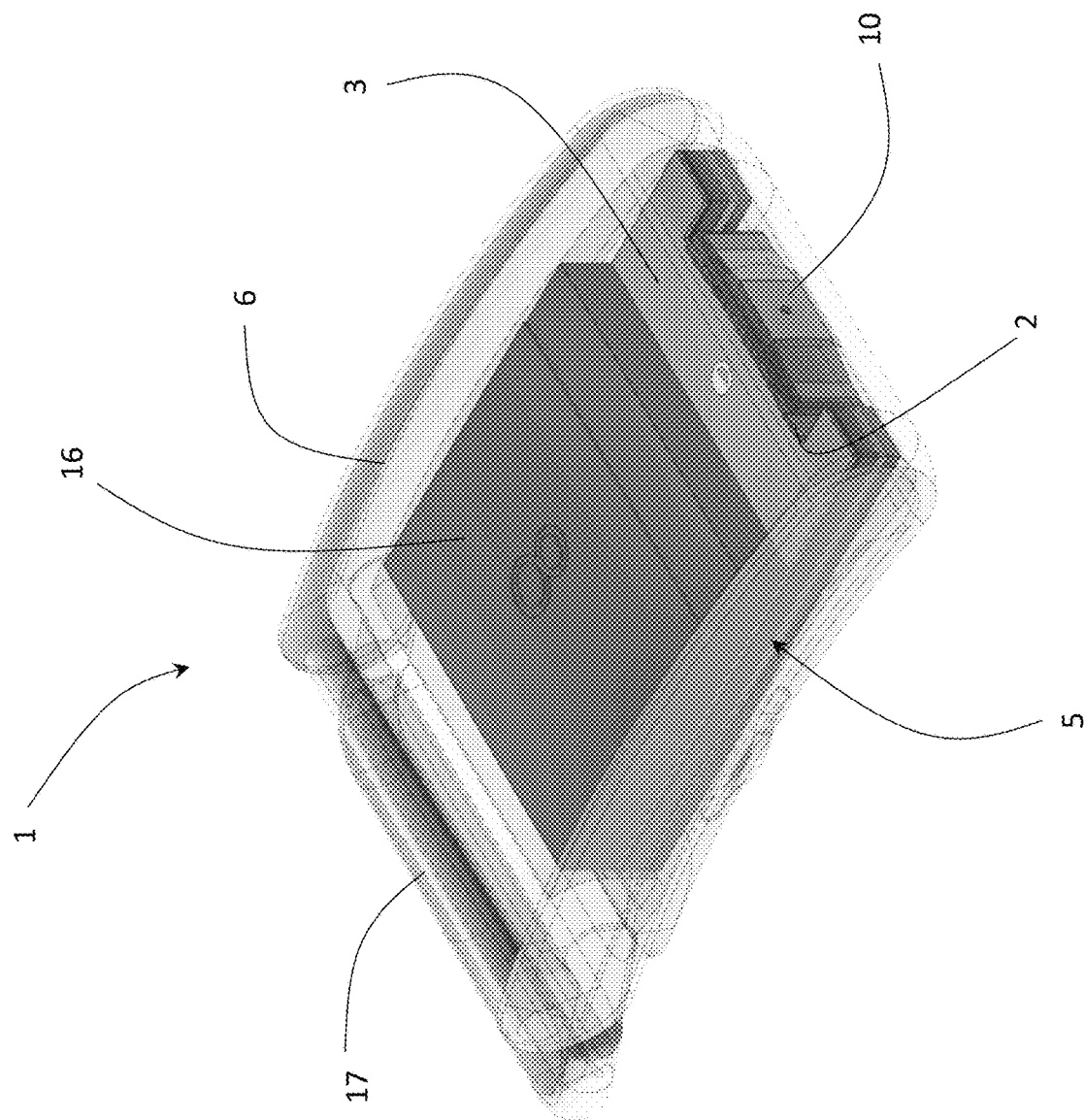
FIG. 3 is an perspective view of the device of FIG. 1.
Figure 4:
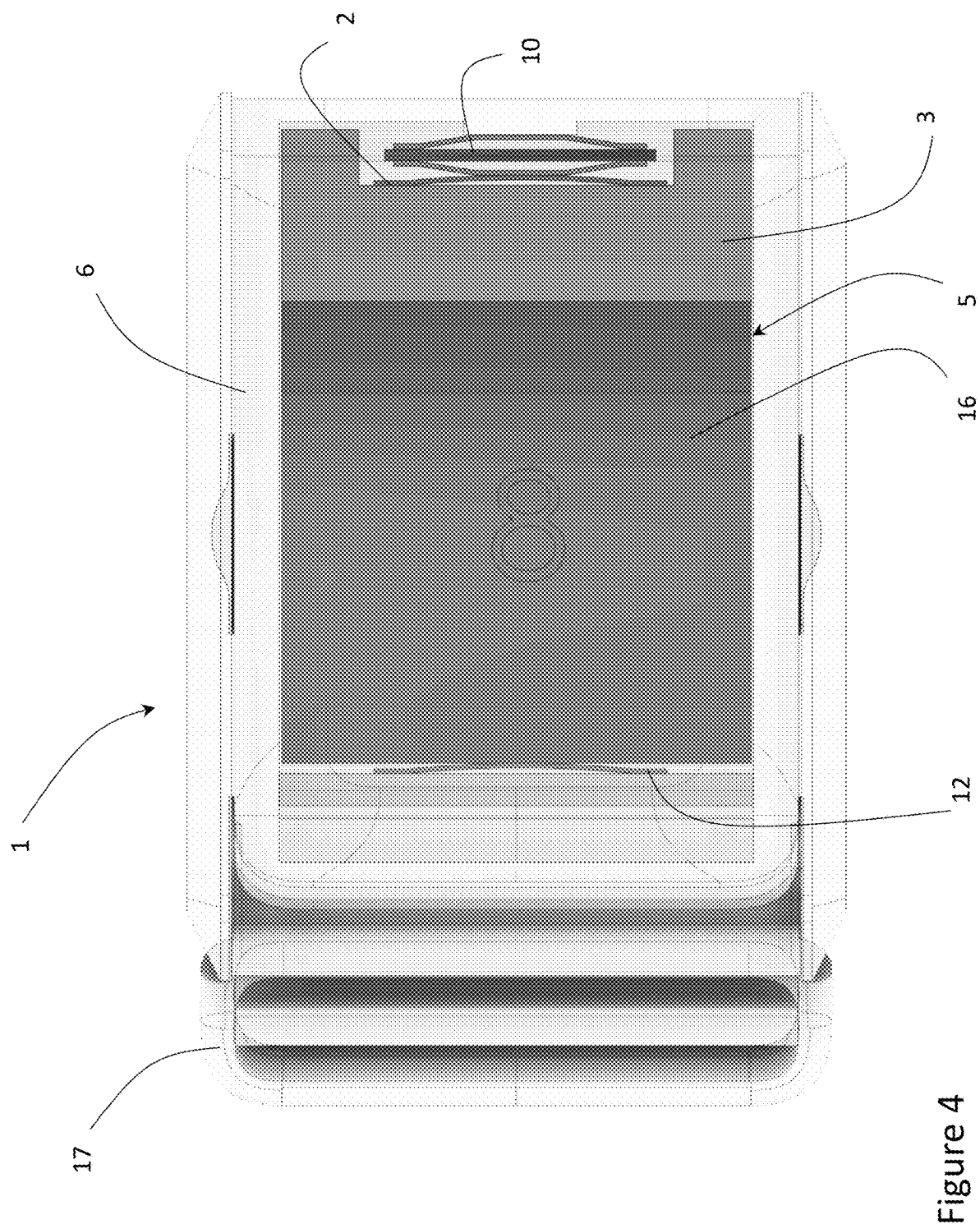
FIG. 4 is a top view of the device of FIG. 1.

While the present teachings are described in conjunction with various embodiments and examples, it is not intended that the present teachings be limited to such embodiments. On the contrary, the present teachings encompass various alternatives and equivalents, as will be appreciated by those of skill in the art.

With reference to FIGS. 1-4, a wearable or other portable device 1, e.g. a smart watch or handheld device, includes a mechanical amplifier comprising a first resilient member, e.g. a first spring 2, inserted between a moveable mass 5, e.g. a battery 3 and/or a controller printed circuit board (PCB) 16, and a piezo-electric actuator ("piezo") 10. The piezo 10 may be mounted on or fixed to a frame or housing, i.e. a reference datum, such as a watch housing 6. The housing 6 may be defined by a first axis, e.g. longitudinal horizontal axis, extending from a upper side to a lower side; a second axis, e.g. lateral horizontal axis, extending from a right side to an opposite left side; and a third axis, e.g. a vertical axis extending from a bottom to a top of the housing 6. The first, second and third axes may be perpendicular to each other. The piezo 10 may be mounted on one of the sides, e.g. upper, lower, right or left, with the moveable mass 5 extending and configured to move along the first axis or the second axis. A second resilient member, e.g. a second spring 12, may connect the moveable mass 5 to the housing 6 at an opposite side to the first resilient member, e.g. the first spring 2, whereby the moveable mass 5 is configured to reciprocate in a first, e.g. horizontal, plane in the housing 6.

The mechanical amplifier or the mechanical amplification element may comprise a spring, calibrated to excite a moveable mass near the natural frequency of the spring-mass system, or a mechanical lever. When the piezo 10 vibrates at or near the natural frequency of the mechanical amplifier system, i.e. the first spring 2, the moveable mass 5 and optionally the second spring 12, the moveable mass 5 has large displacement, normally in a sinusoidal wave form. The wearable or portable device 1 may include a lower base 14, which may or may not be integral with the housing 6, and an upper face 15 comprising a display or a cap on the top of the housing 6 for displaying information in digital form provided by the controller PCB 16 disposed in the housing 6 in contact with the battery 3. Alternatively, the portable device 1 may simply include some other electronic device, such as a transmitter, e.g. blue tooth, to transmit information from the controller PCB 16 to a remote device, e.g. user's cell phone or computer, whereby the upper face 15 may be simply a cover or a simple time display. One or more lugs 17 or some other form of strap connector may be provided extending from the housing 6 for connecting the housing 6 to a watch band or arm strap etc. for mounting the housing 6 to a user, e.g. arm, leg, belt etc.

For example, for the wearable or other portable device 1, the reference datum may comprise the housing 6, the moveable mass 5 may comprise one or more of the battery 3, the controller PCB 16, and some other moveable body, e.g. component, provided in the housing 6, preferably, to save space, provided for some other predetermined use, e.g. display in upper face 15, cover in lower base 14, insulation, electrical component, etc. Alternatively or in addition to one or more of the aforementioned elements, the moveable mass 5 may include or comprise a moveable body, which has no other purpose. The first elastic member may comprise the first spring 2 disposed adjacent the piezo 10 and the second spring 12 on the opposite side of the moveable mass 5 between the moveable mass 5 and the housing 6. By using the piezo 10 to vibrate the moveable mass 5 with large amplitude sinusoidal waves, energy in the form of kinetic energy (vibration) is transferred from the piezo 10 via the first spring 2 and/or the second spring 12 to the housing 6 and subsequently the user.

If the "battery" 3 or the PCB 16 was fastened to the piezo 10, its displacement would be limited to the same small displacement of the piezo 10, limiting the amount of energy in the portable device 1, e.g. the smart watch. By using the first springs 2 and/or the second spring 12 tuned to excite the moveable mass 5 near the natural frequency of the mechanical amplifier system, displacement increases and may be multiple, e.g. 5x-50x, times the displacement of the piezo 10. At a given frequency, the greater displacement will translate into greater speed and greater acceleration of the moveable mass 5. The greater acceleration of the moveable mass 5 will result in a greater resulting force (Newton's second law F=ma) on the piezo 10, and at the same time on the housing 6, which will transmit greater haptic feedback to the user.

In the example illustrated in FIGS. 1-4, the mechanical amplifier system includes a spring system comprised of the first spring 2 and the second spring 12 are positioned at opposite ends of the first axis, e.g. the longitudinal axis, and opposite sides of the moveable mass 5, which is parallel to the upper face 15. Accordingly, the first spring 2, the second spring 12 and the piezo 10 are mounted on the sides of the housing 6 enabling the moveable mass 5 to move in a plane including the first and second axes and parallel to the upper face 15.

Figure 5:
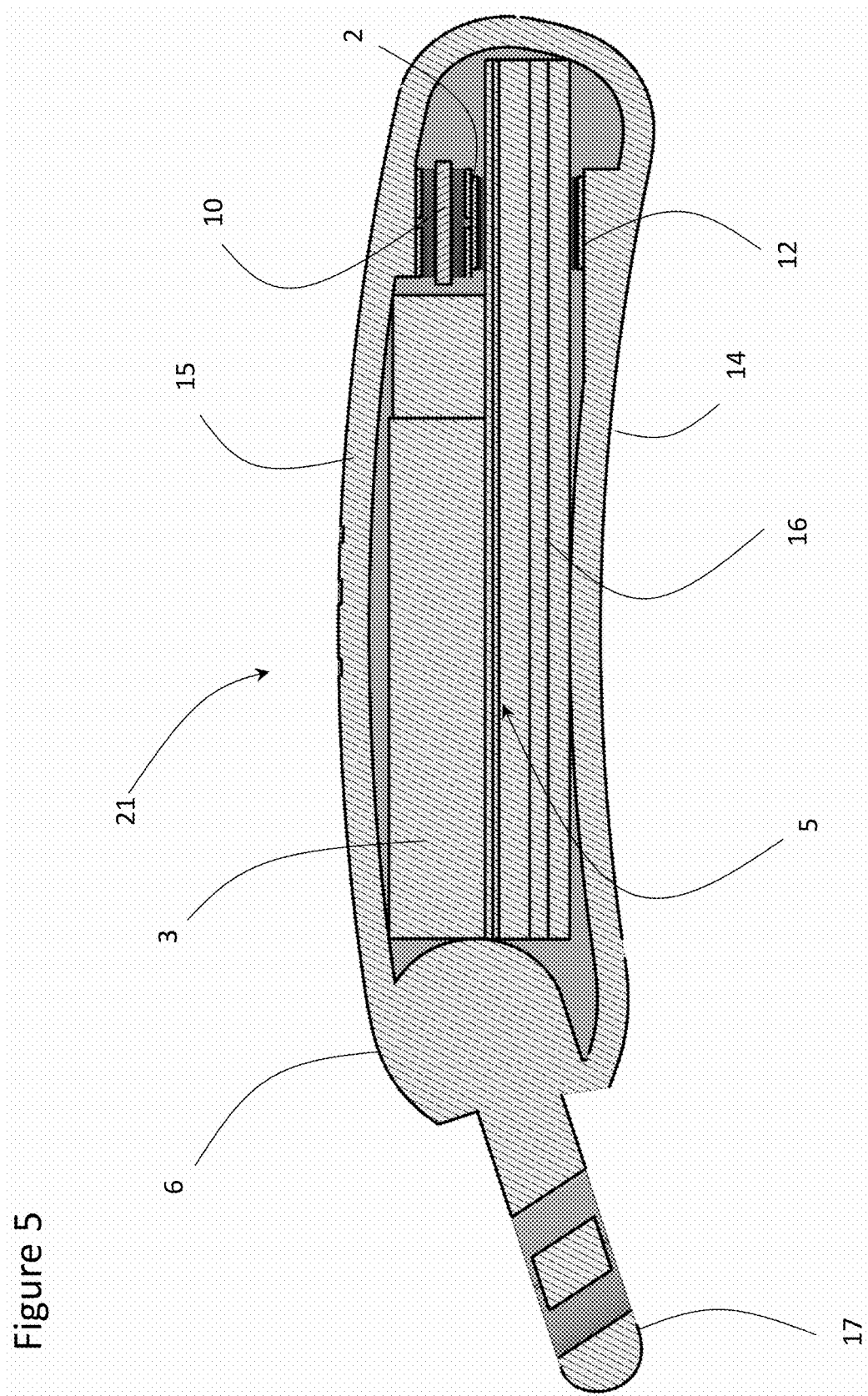
FIG. 5 is a cross-sectional view of another example embodiment of the present disclosure.
Figure 6:
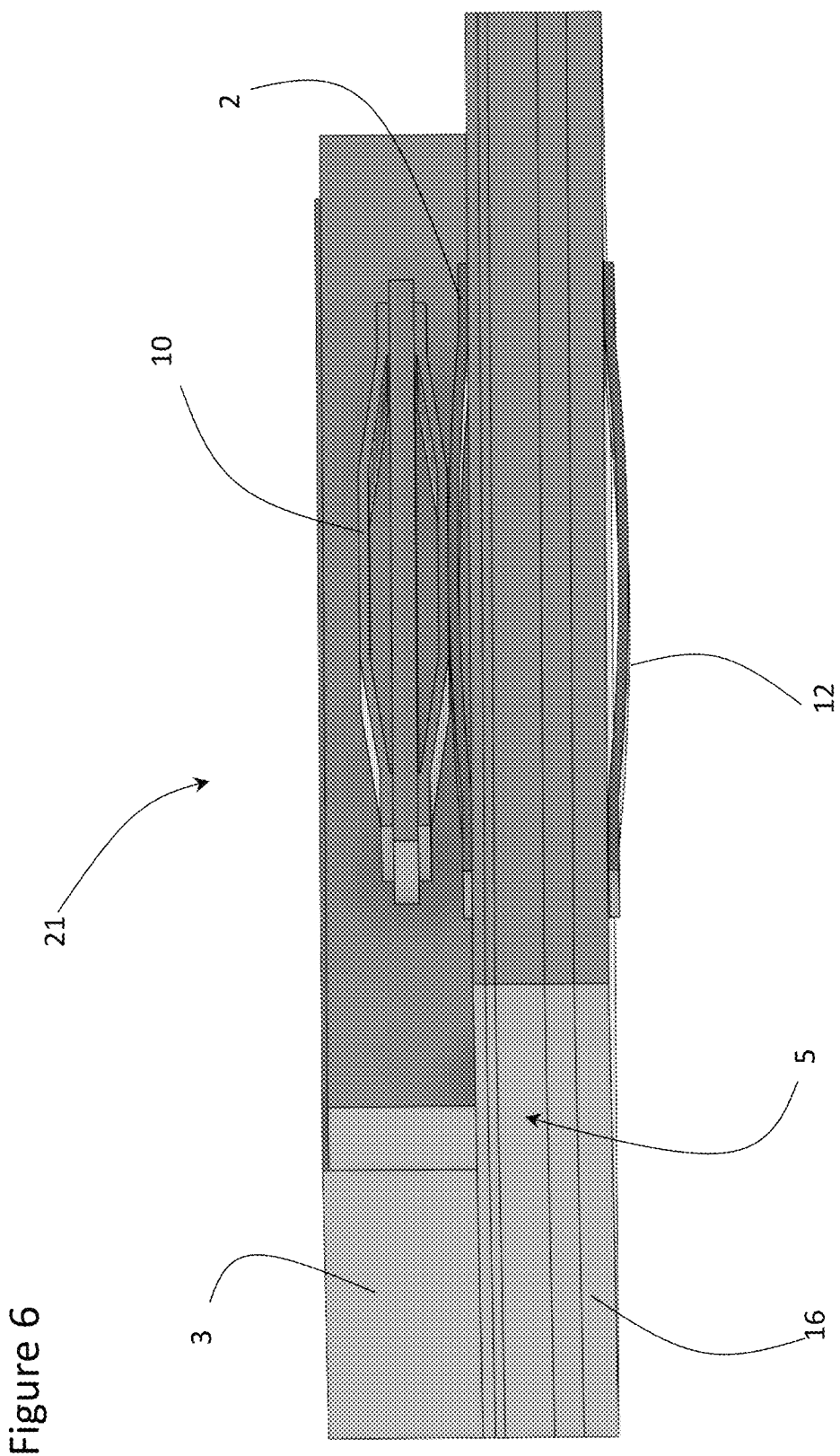
FIG. 6 is a perspective view of the mechanical amplifier system of the device of FIG. 5.
Figure 7:
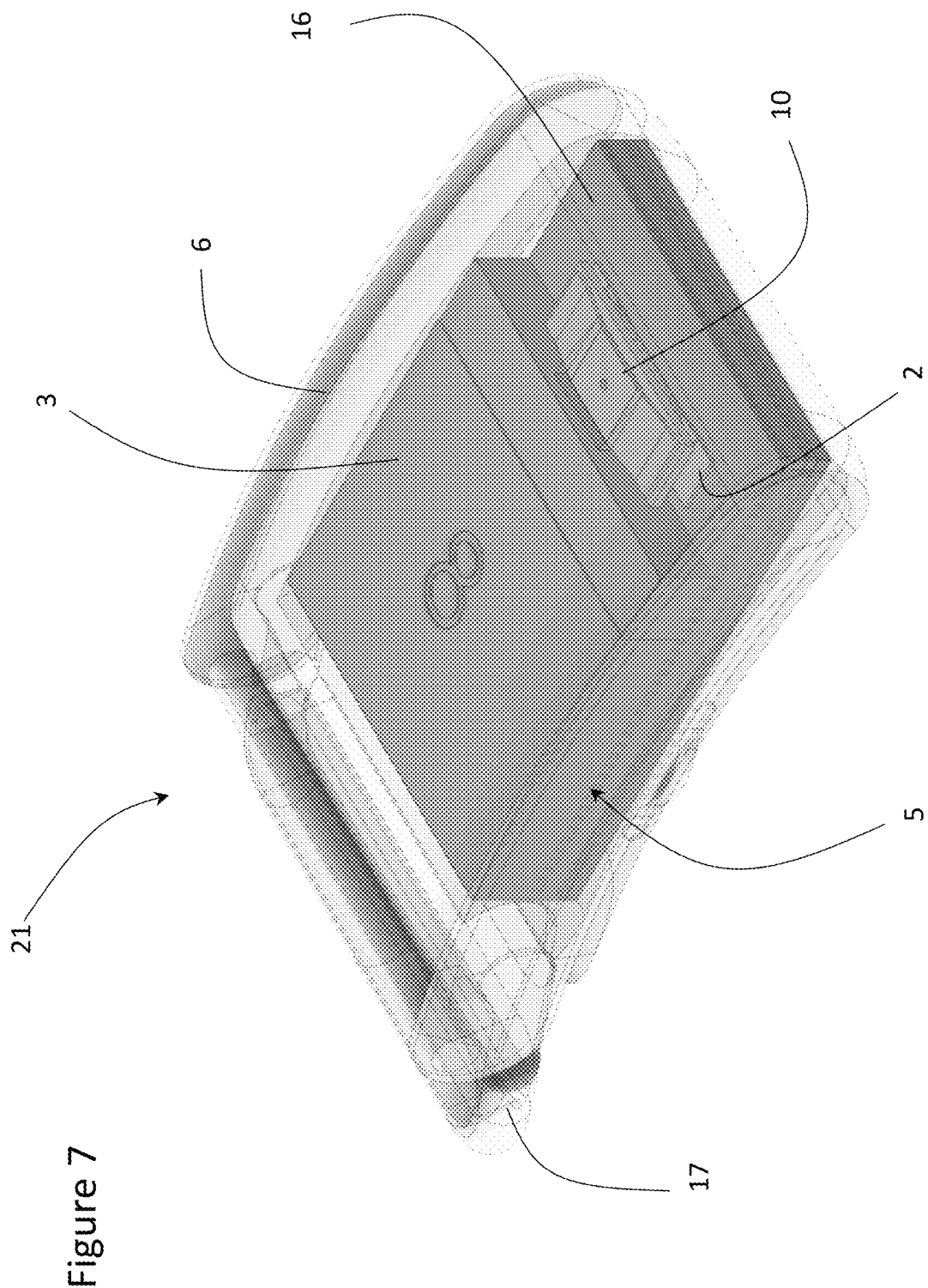
FIG. 7 is a perspective view of the device of FIG. 5.
Figure 8:
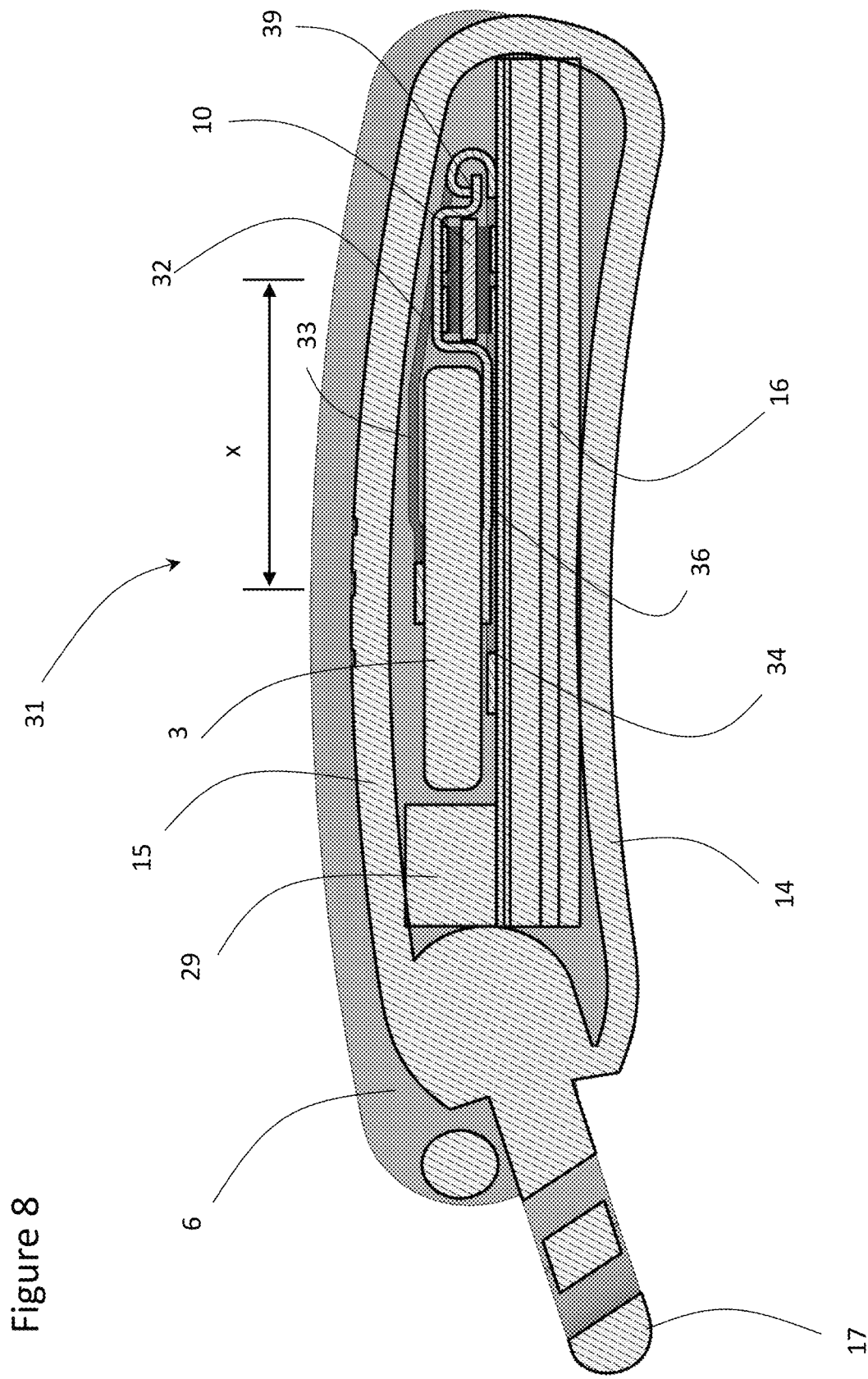
FIG. 8 is a cross-sectional view of another example embodiment of the present disclosure.
Figure 9:
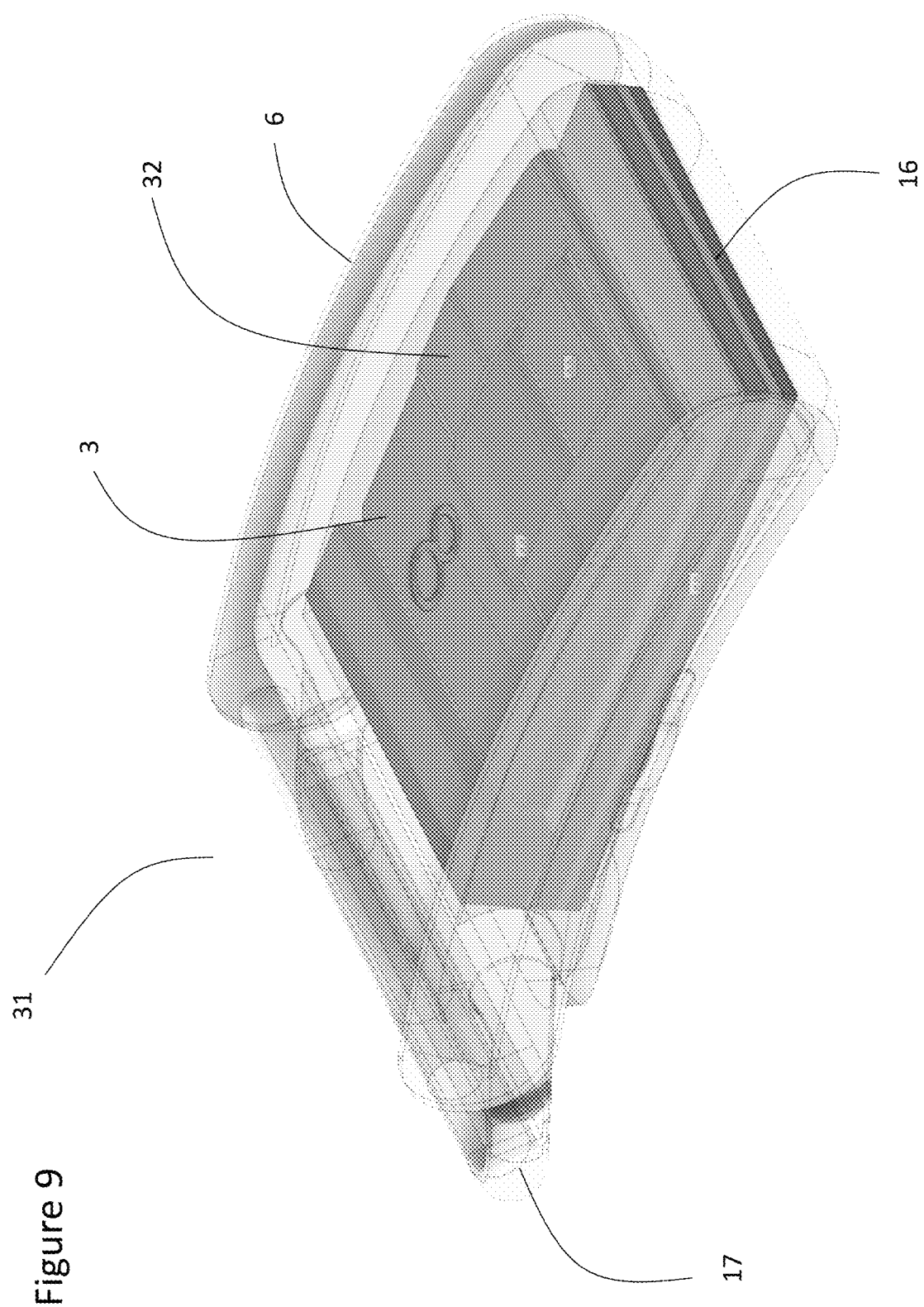
FIG. 9 is a perspective view of the mechanical amplifier system of the device of FIG. 8.
Figure 10:
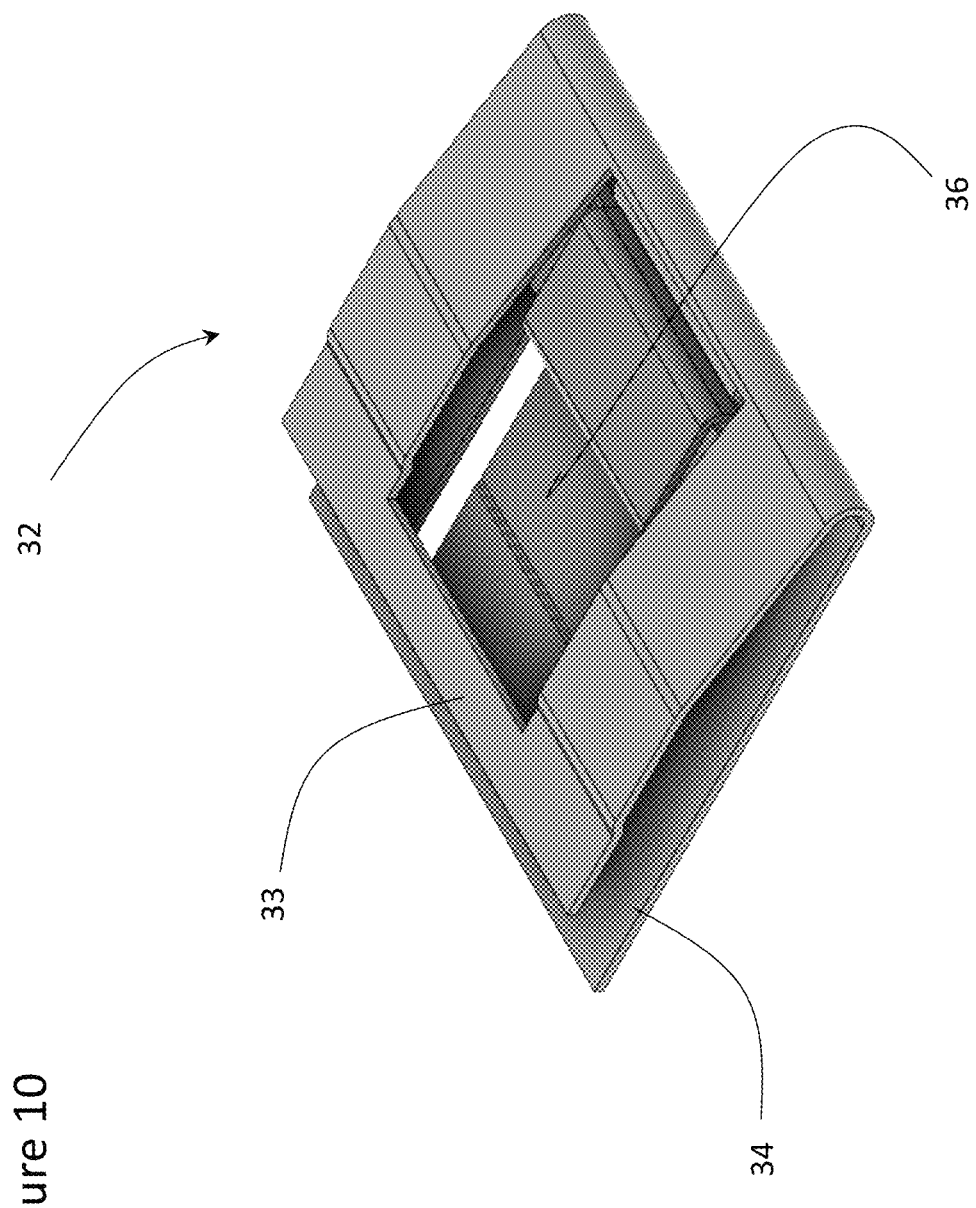
FIG. 10 is a perspective view mechanical amplifier of the device of FIG. 8.

With reference to FIGS. 5-7, an example wearable or other portable device 21, includes the mechanical amplifier comprising the first spring 2 and/or the second spring 12 disposed at opposite ends of the third, e.g. vertical axis, which is substantially perpendicular to the upper face 15. The first spring 2 and the second spring 12 may be positioned at an upper and lower surface of the moveable mass 5, e.g. the battery 3 and/or the PCB 16, respectively, sandwiching the moveable mass 5 therebetween. Accordingly, the first spring 2 and the piezo 10 may be mounted on the top of the housing 6, e.g. lower surface of upper face 15, and the second spring 12 may be mounted on the lower base 14 of the housing 6, or vice versa. Electrical insulation may be provided between components, e.g. between the battery 3 and the piezo 10, to prevent unwanted electrical transmission. To ensure electrical contact between the battery 3 and the PCB 16 even during vibration or the spring 12, a flexible printed circuit may be used extending therebetween.

With reference to FIGS. 8-11, a wearable or other portable device 31 includes a mechanical amplifier comprising a lever 32 configured for amplifying the movement of the piezo 10. Again, this solution could also benefit from having a rigidity of the lever 32 tuned to excite the mechanical amplifier system, e.g. the moveable mass 5 and the lever 32, near its natural frequency, but a mechanical amplifier system that simply amplifies the movement of the piezo 10 using the lever 32 or another means is also within the realm of the invention. The piezo 10 may be mounted on the PCB 16 with the lever 32 extending parallel to the PCB 16 and the upper face 15 along one of the first or second horizontal axes.

The lever 32 may be a simple sheet of spring steel that includes a lower arm or flap 36 connected on top of the piezo 10 and to one side, e.g. bottom, of the moveable mass 5, e.g. battery 3, that bends or pivots relative to a base 34. In the illustrated example, the lever 32 may also include an upper arm or flap 33 extending over top of the moveable mass 5, e.g. the battery 3, on either side of the piezo 10, and then into contact with the lower arm or flap 36 at a contact joint 39. The distance x between the piezo 10 and the moveable mass 5, e.g. battery 3, is carefully set to tune the rigidity of the mechanical amplifier system, e.g. the lever 32 and the moveable mass 5. When the piezo 10 vibrates near the natural frequency of the mechanical amplifier system, the lower arm 36 and optionally the upper arm 33 start to bend and amplify further the movement of the moveable mass 5 (similar to a whip). A battery protection component 29, e.g. a thermal fuse, may be provided between the battery 3 and the housing 6 to protect and limit movement of the battery 3. Electrical insulation may be provided between components, e.g. between the battery 3 and the piezo 10, to prevent unwanted electrical transmission. To ensure electrical contact between the battery 3 and the PCB 16 even during vibration or the lever 32, a flexible printed circuit may be used extending therebetween.

Figure 11:
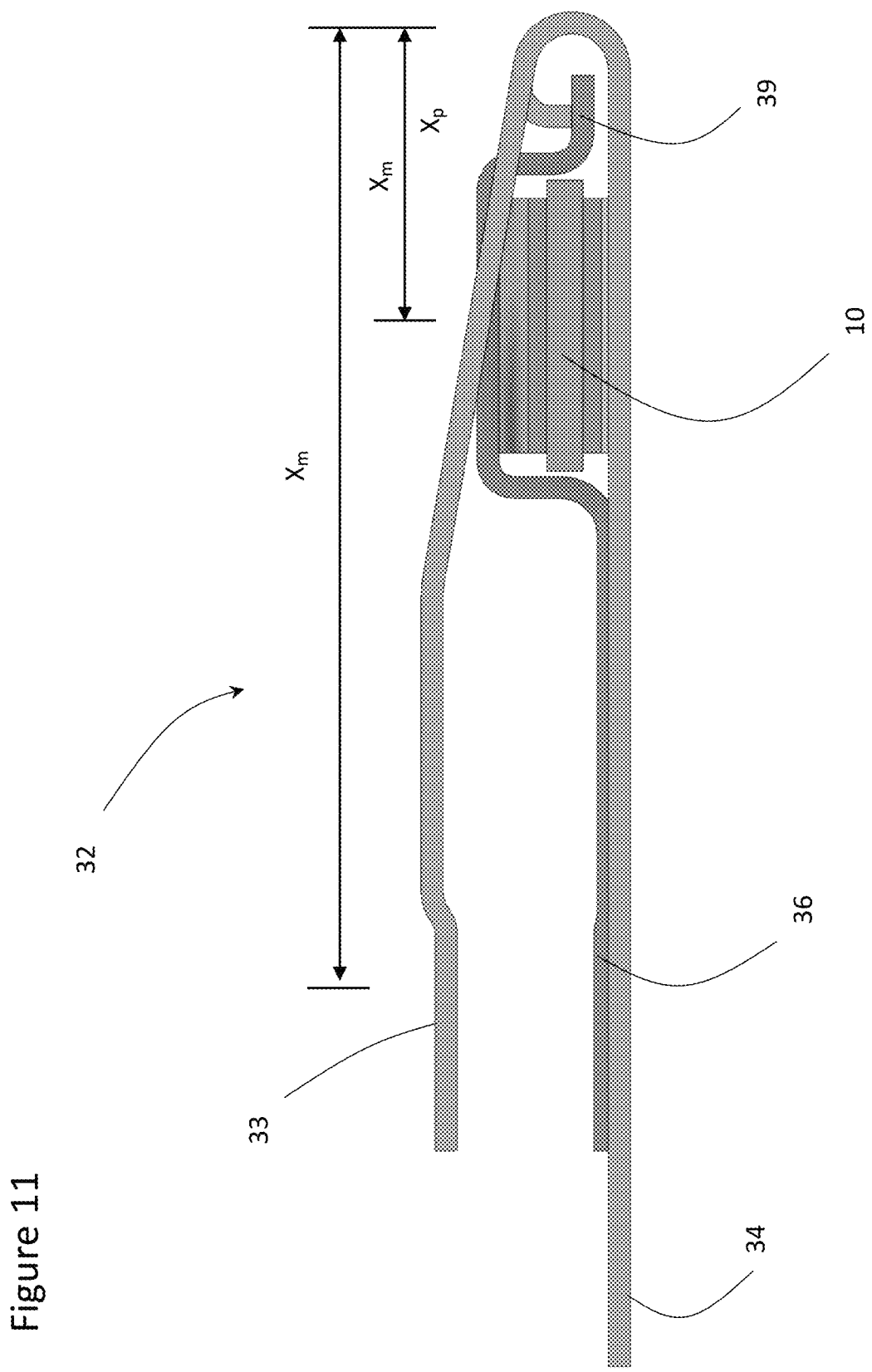
FIG. 11 is a side view mechanical amplifier of the device of FIG. 8.
Figure 12:
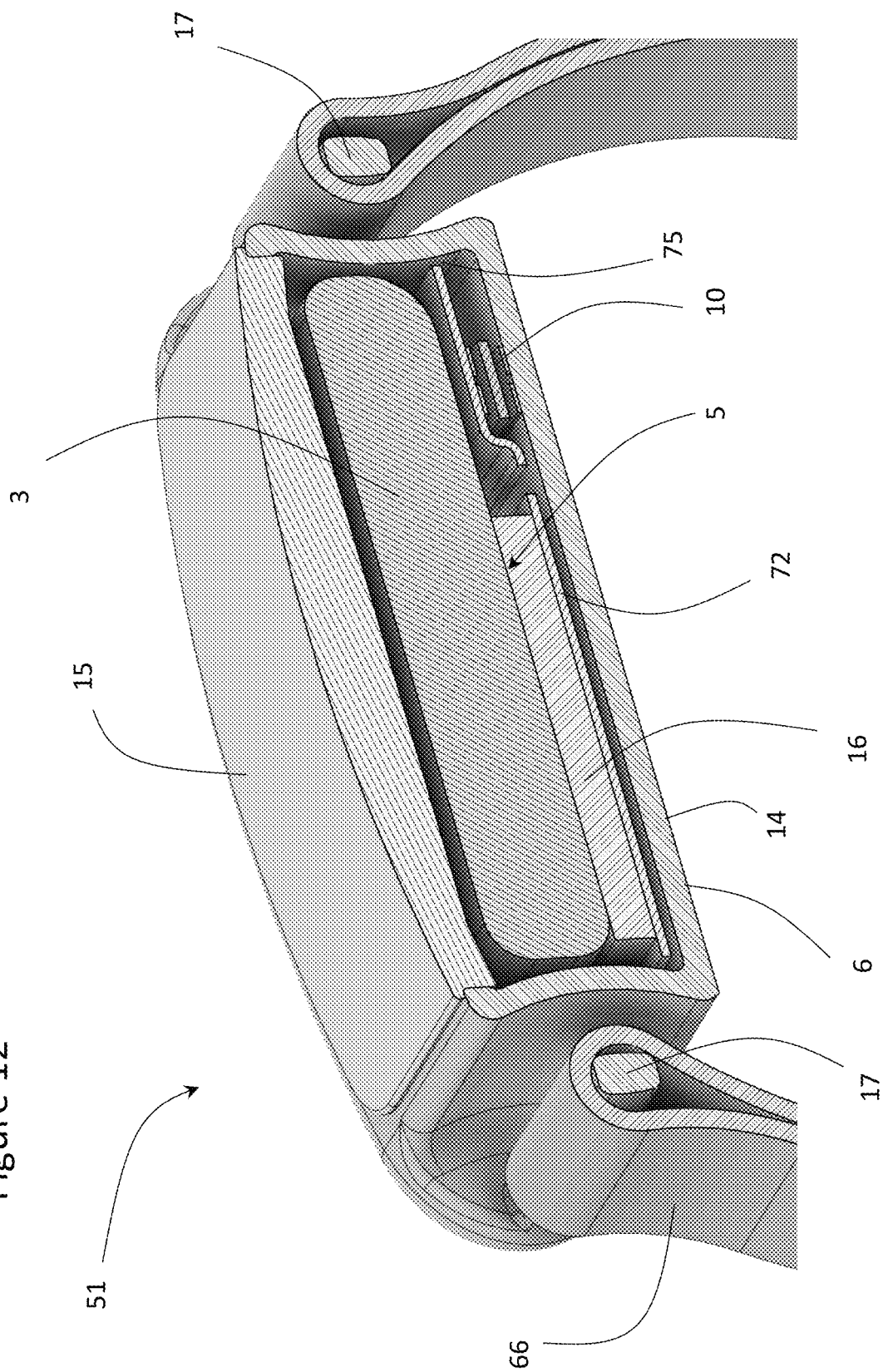
FIG. 12 is a cross-sectional view of another example embodiment of the present disclosure.
Figure 13:
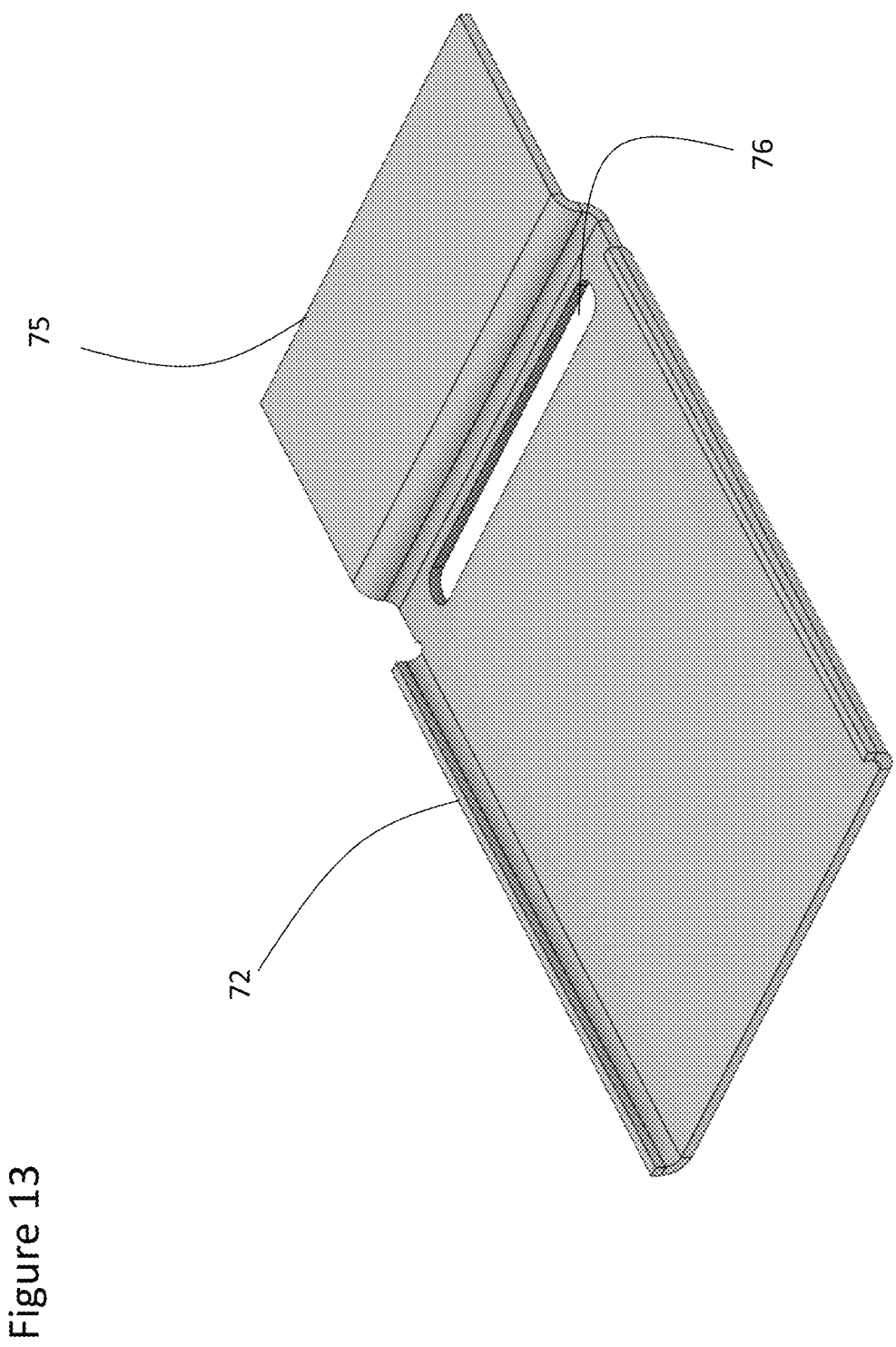
FIG. 13 is a perspective view of the mechanical amplifier of the device of FIG. 12.
Figure 14:
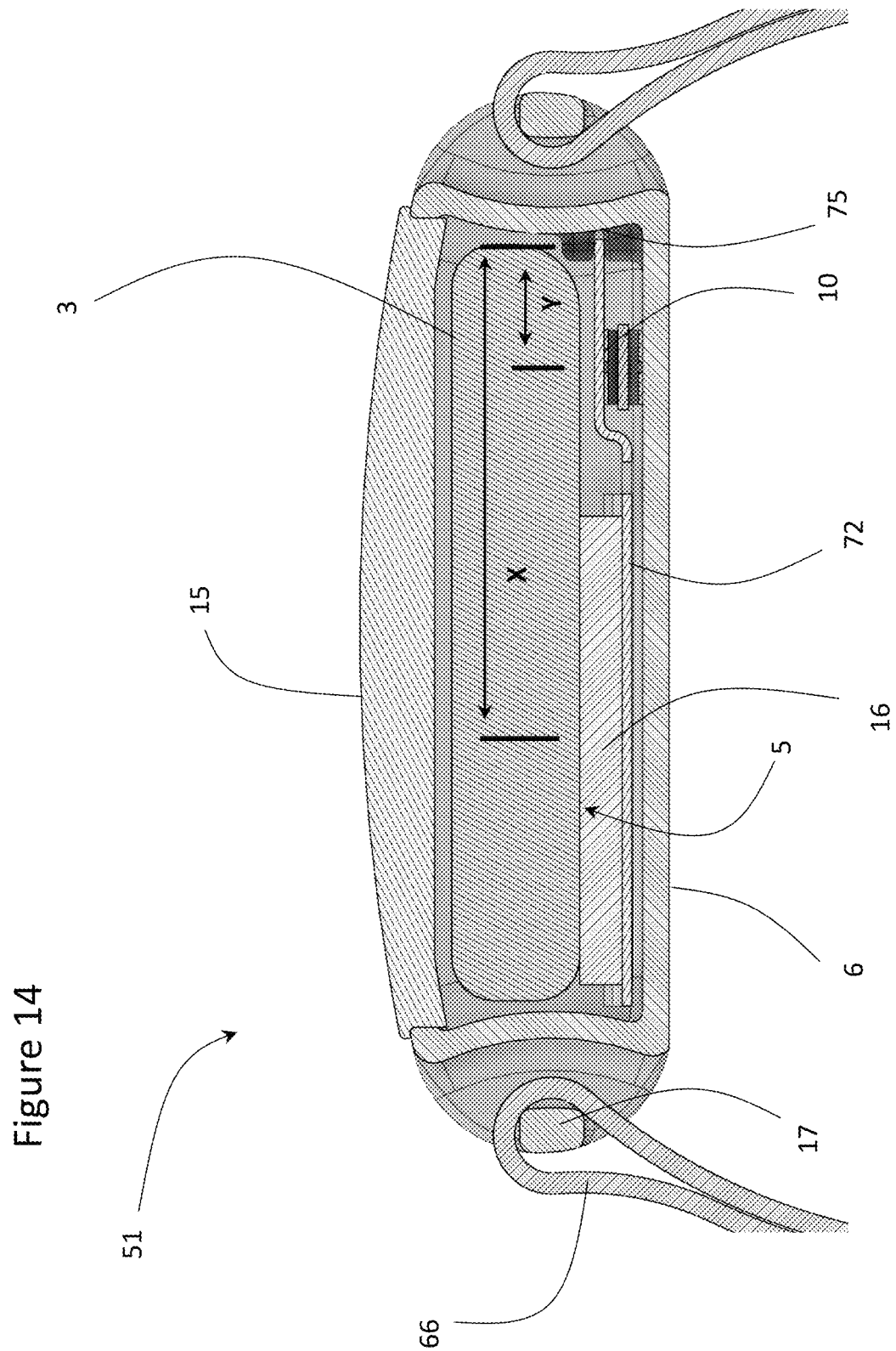
FIG. 14 is a cross-sectional side view of the mechanical amplifier of the device of FIG. 12.

With reference to FIG. 11, even if the lower arm 36 would be perfectly rigid, the movement would be amplified by the mechanical gain by a factor of $X_m/X_p$ (distance pivot-mass/distance pivot-piezo).

In another example, illustrated in FIGS. 12-16, a wearable or other portable device 51 includes the device frame, shell or housing 6, the lower base 14, the upper face 15, a bracelet 66, or some other strap, held by the lugs 17, the piezo 10, the PCB 16, the battery 3, and a mechanical amplifier comprising a spring and/or a lever 72. The spring and/or lever 72 may comprise a simple sheet of spring steel, which may include an S-shaped bend in between where the piezo 10 is mounted and where the moveable mass 5 is mounted. The spring or lever 72 may be comprised of a resilient material forming the spring or lever 72 into a flat spring.

The piezo 10 may be mounted on the housing 6, e.g. the lower base 14, and to one end of the spring and/or lever 72. The battery 3 may be mounted on the PCB 16, which may be mounted on the other end of the spring and/or lever 72, thereby suspended in the casing. When the piezo 10 is activated, the spring and/or lever 72 rotates at its connection, i.e. hinge joint 75, with the housing 6 and the moveable mass 5, e.g. battery 3 and/or the PCB 16 move, e.g. vibrate up and down parallel to the third vertical axis, substantially perpendicular to first and second horizontal axes. The movement of the moveable mass 5 may be increased by the fact that there is a mechanical gain in terms of displacement created by the lever effect; the distance X between the center of mass of the moveable mass 5 and the hinge joint 75 is greater than the distance Y between the piezo 10 and the hinge joint 75.

To increase the movement of the moveable mass 5, a section of the spring and/or lever 72 may comprise a reduction in size or removed creating an elongated opening 76, in between the piezo 10 and the moveable mass 5, proximate the piezo 10 to lower the spring rate thereof to enable amplification of the oscillation (tuned spring rate).

Figure 15:
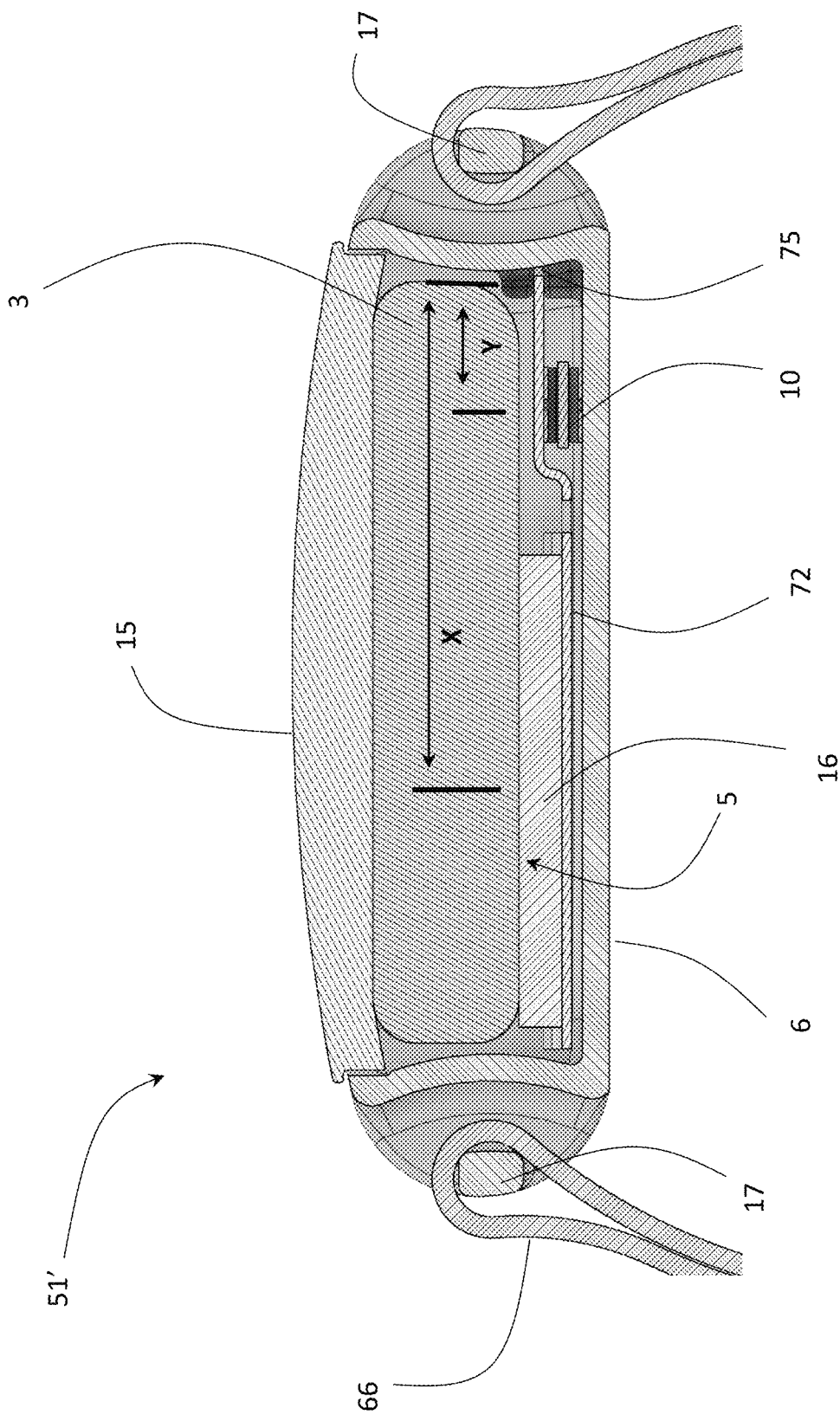
FIG. 15 is a cross-sectional view of another example embodiment of the present disclosure.

FIG. 15 illustrates a wearable or other portable device 51' similar to the wearable or other portable device 51, but the upper face 15 is bonded to the battery 3 and is part of the moveable mass 5. Accordingly, the upper face 15 may be flexibly or resiliently mounted on the housing 6 to enable slight movement thereof, whereby the moveable mass 5 includes the PCB 16, the battery 3 and the upper face 15.

Figure 16:
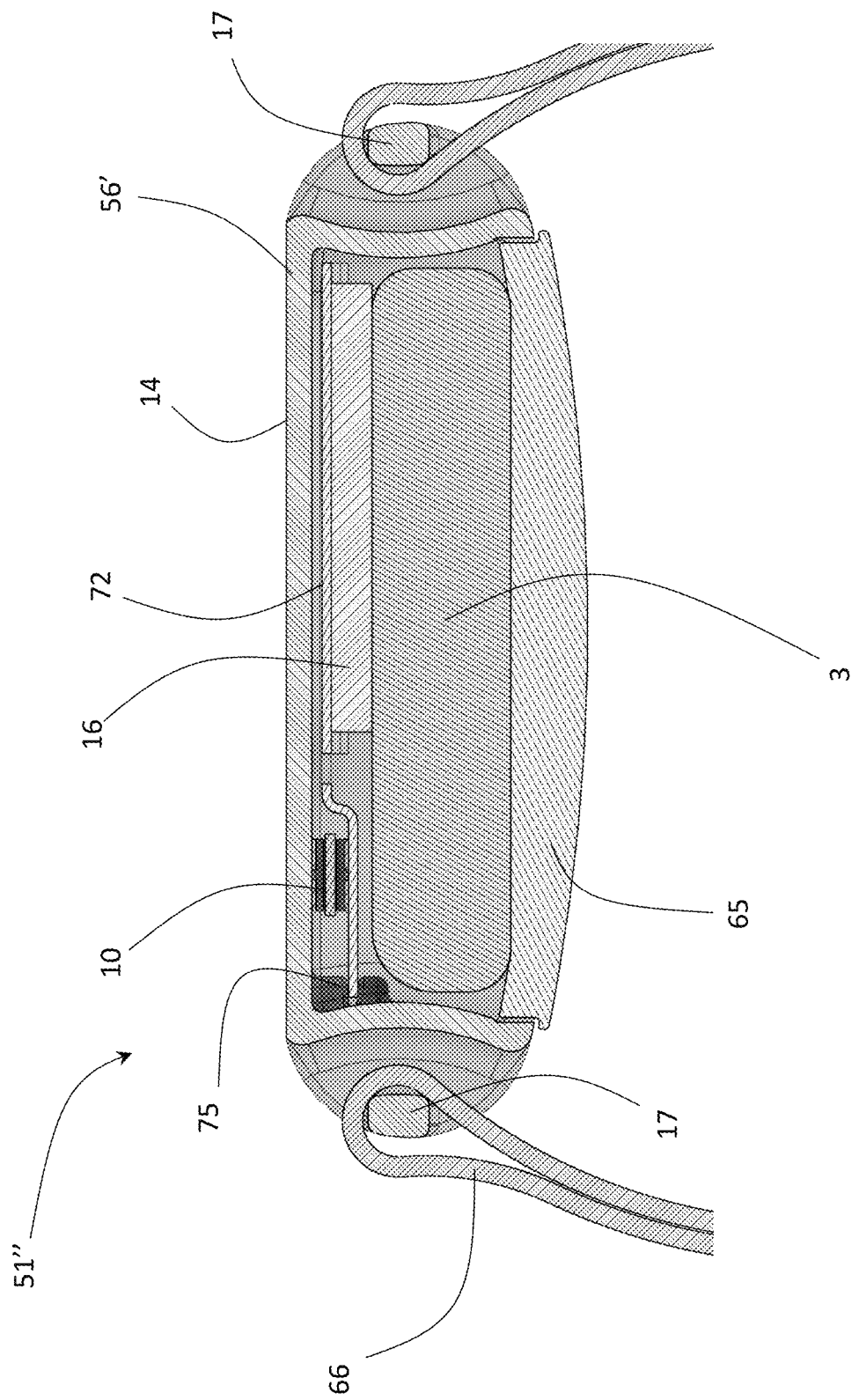
FIG. 16 is a cross-sectional view of another example embodiment of the present disclosure.

FIG. 16, illustrates a wearable or other portable device 51", similar to wearable or other portable devices 51 and 51', in which the housing 6 is inverted, and the upper face 15 comprises a bottom cap 65, which may comprise a battery or sensors, often seen on smart watches. The difference here is that it is the bottom cap 65 that may be in contact with the user's skin, whereby the moveable mass 5 includes the PCB 16, the battery 3 and the bottom cap 65, which vibrates directly on the skin of the user.

Figure 17:
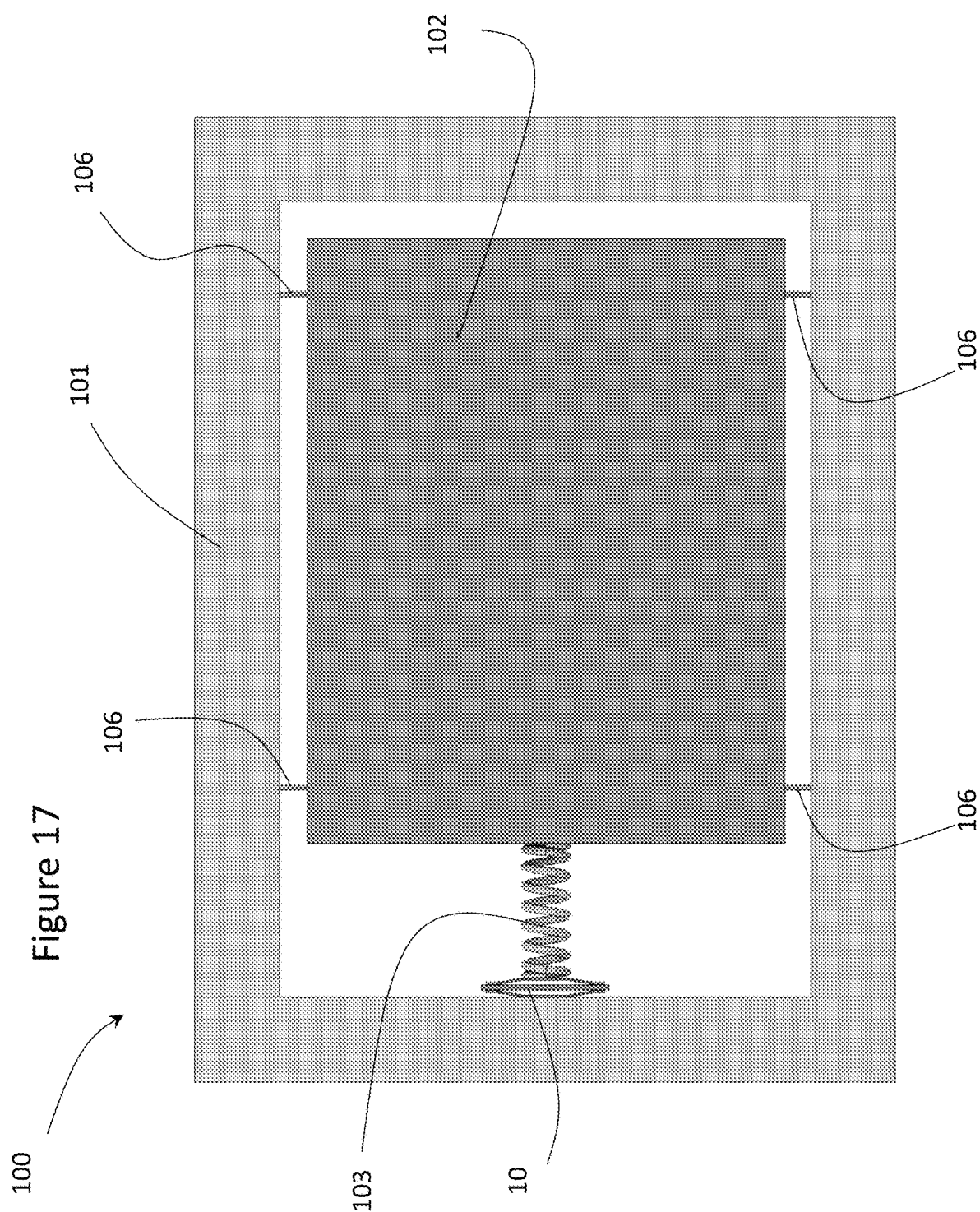
FIG. 17 is a top view of another example embodiment of the present disclosure.

With reference to FIG. 17, a display system 100, which may be wearable, portable or even fixed, comprises a suspension frame 101, which may comprise the housing 6 or some larger frame; a display 102, which may comprise the upper face 15 or some other display; a mechanical amplifier 103, which may comprise any one of the mechanical amplifiers disclosed herein; the piezo 10; and one or more resilient suspension holders or guides 106 configured to hold and guide the display during movement. The display 102 may comprise the moveable mass 5 of the previous embodiments. The mechanical amplifier may comprise a first spring, such as a coiled spring 103, and the suspension holders or guides 106 acting as a second spring for biasing the moveable mass 5, e.g. the display 102, in the opposite direction to the first spring 103, e.g. back to a rest or initial position.

The one or more suspension holders or guides 106, preferably a plurality of evenly space apart suspension holders or guides 106, extend between the frame 101 and the display 102 and enable some movement of the display 102 in relation with the frame 101, e.g. axial movement in the frame 101, in the direction of the extension and contraction of the spring 103. The piezo 10, which may be mounted on the suspension frame 101, pushes against the spring 103, which pushes against the display 102. The spring rate is tuned so that the amplitude of the displacement of the display 102 is larger than the displacement of the piezo 10 (amplification of the displacement) if the activation of the piezo 10 is near the natural frequency of the amplification system, e.g. the mechanical amplifier (the spring 103) and the moveable mass 5 (the display 102). Again, the displacement of the piezo 10 is normally limited, but by using this configuration, it is possible to amplify the movement/displacement/haptic feedback of the display 102.

If used in context of a handheld/wearable device, the display 102 may be the moveable mass 5, instead of the internal components such as battery 3, PCB 16, etc., and the frame 101 may be the housing 6. The large vibrations of the moveable mass 5, e.g. the display 102, would be transmitted to the frame 101 via the spring 103 and the piezo 10, which would then be transmitted to the user.

Figure 18:
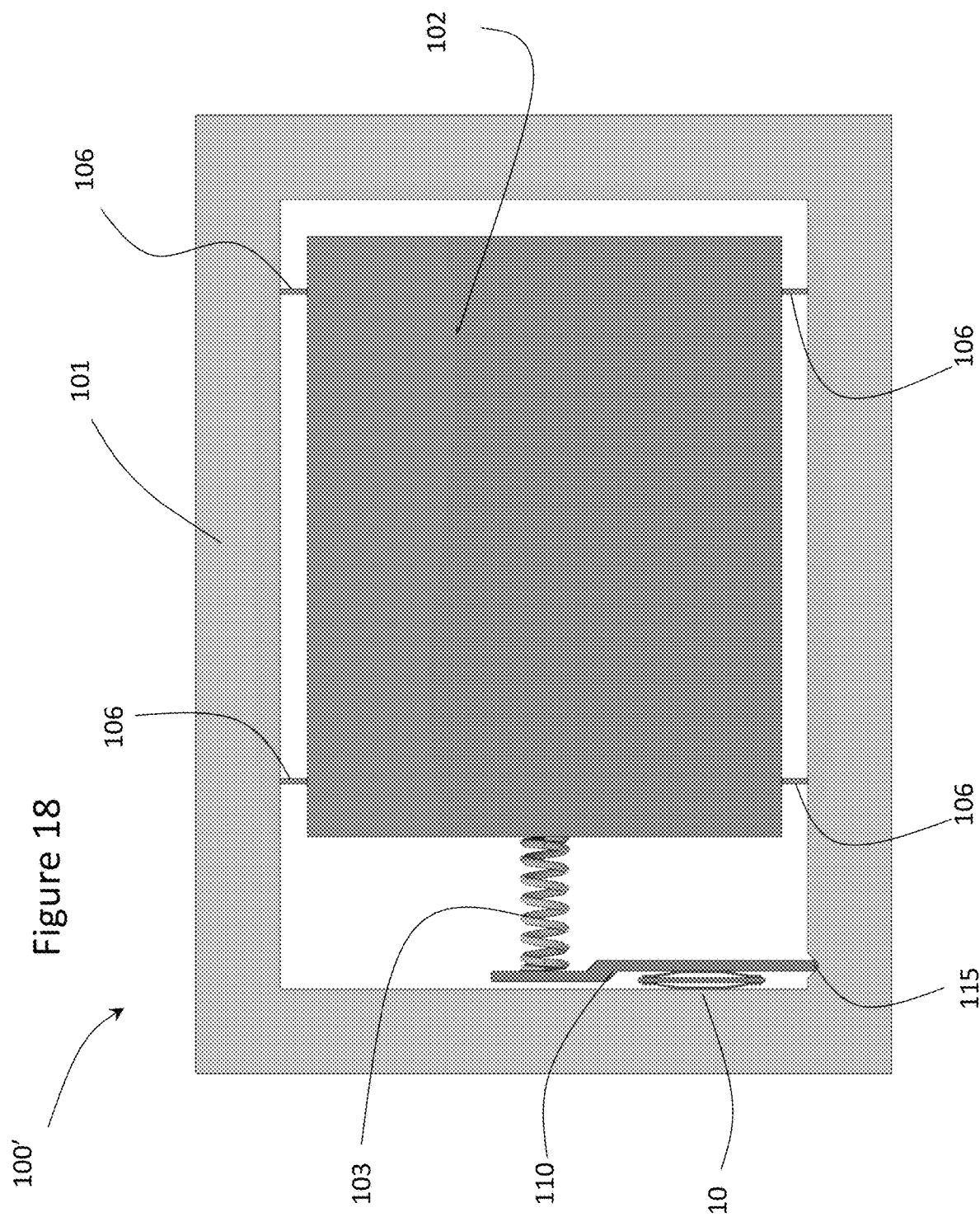
FIG. 18 is a top view of another example embodiment of the present disclosure.
Figure 21:
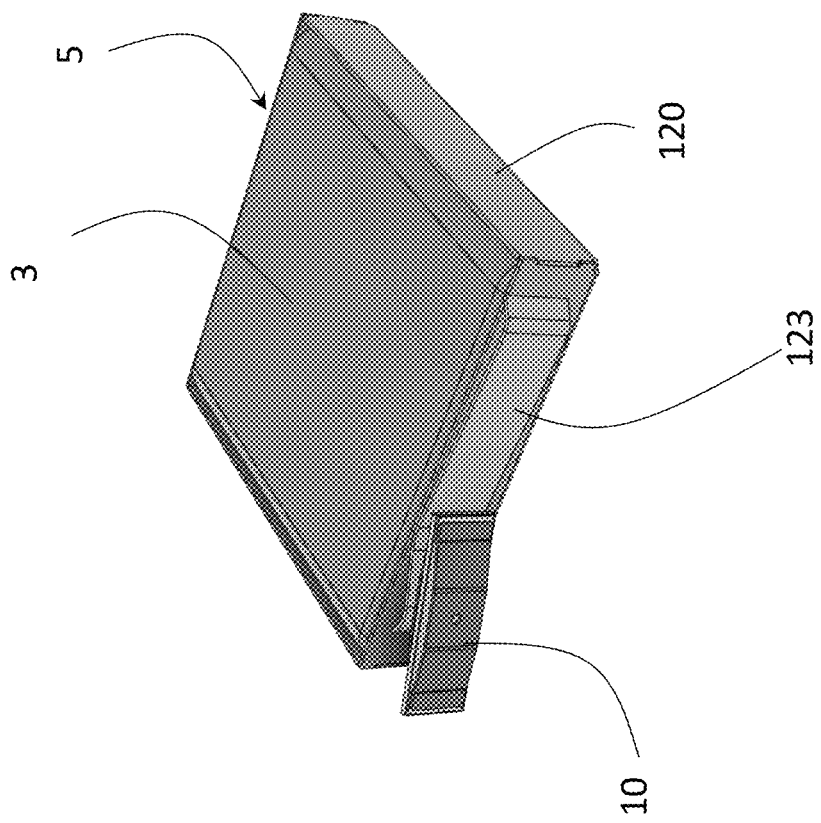
FIG. 21 is a perspective view of the mechanical amplifier of the device of FIG. 19.
Figure 20:
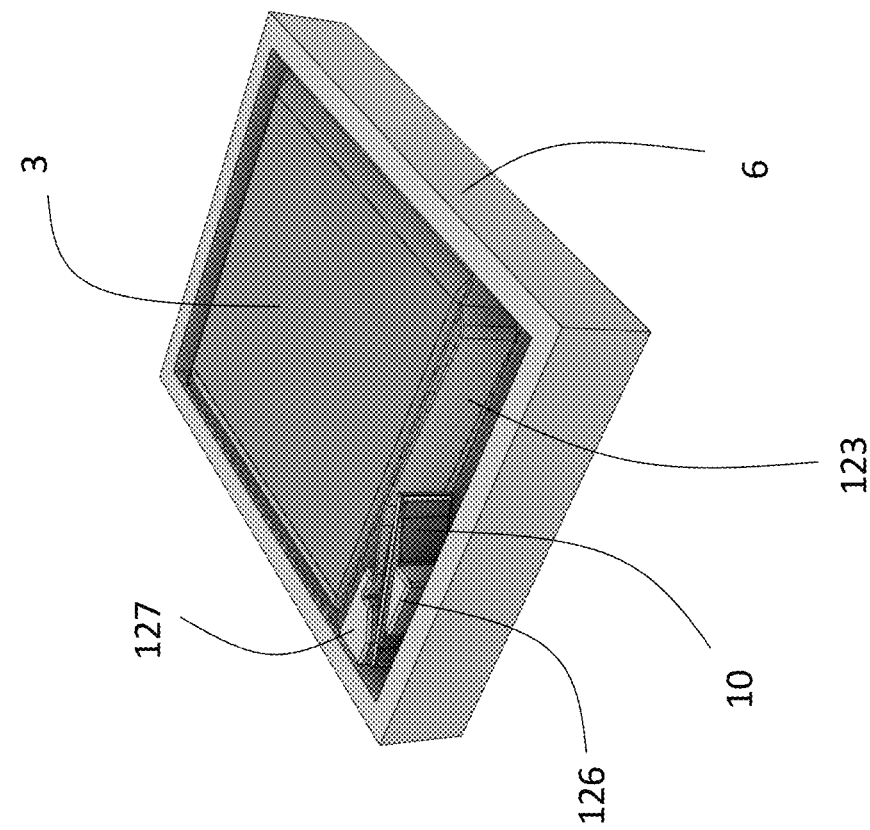
FIG. 20 is a perspective view o of the device of FIG. 19.

With reference to FIG. 18, a large display system 100', very similar to the previous display system 100, in which the mechanical amplifier also includes a lever 110 between the piezo 10 and the spring 103. The idea is to amplify the movement produce by the piezo 10 with the lever 110 to provide additional mechanical gain. The lever 110 in this case would rotate about a pivot point 115 pivotally connected to the frame 101.

The same system could be designed so that the spring 103 may be eliminated, and all the amplification from the mechanical amplifier would be provided by the mechanical gain of the lever 110. Another system could use a flexible lever 110 that would replace the spring 103 and/or the solid lever 110. The end of the beam/lever 110 that connects the moveable mass 5, e.g. display 102, would act as a whip to amplify the amplitude of the oscillation.

Again, any of the aforementioned mechanical amplifier systems may be used in a handheld/wearable device where the display 102 is the moveable mass 5, e.g. the battery 3 and/or the PCB 16 or other components, and the frame 101 is the device housing 6.

The main difference between the large display 100 or 100' and the handheld/wearable devices 1, 21 or 51 is that the large displays are often fastened to a large datum, e.g. an infotainment system, attached to a car's dashboard. In this case, it is the display 102 that the user touches, and all the vibrations (oscillation/haptic feedback) need to be transmitted from the piezo 10 to that display 102. In a handheld/wearable device 1, 21 or 51 there is no fixed datum, the moveable mass 5, e.g. the battery 3 and/or the PCB 16 and/or other component, transmits its vibration only to the non-suspended or fixed mass, e.g. device frame or housing 6, which transmits the vibration/haptic feedback to the user.

With reference to FIGS. 19-23, a wearable device system 200, similar to the previous large display system 100', includes a guiding system between the moveable mass 5, e.g. the battery 3, and the housing 6. Translation of the moveable mass 5, with reference to the housing 6, is possible since there is play, i.e. gap, between the housing 6 and the moveable mass 5. A tray 120 may be used to receive and contain and/or protect the moveable mass 5. The tray 120 may be used to protect the battery 3, since most of the batteries 3 used in smart watches/smartphones/fitness trackers/wearables are "pouch" style, whereby the use of the tray 120 ensures that the force applied to the moveable mass 5 translates in movement, not in deformation of the battery 3. It is also easier to control the shape and the size of the tray 120, then it is to control the shape and size of a pouch battery 3. This can lead to less friction between the tray 120 and the frame or housing 6 than between the battery 3 and the frame or housing 6. The tray 120 may be comprised of one or more of the following: sheet metal, cast metal or plastic.

A mechanical amplifier system may include a first lever and/or spring element 123 disposed between the piezo 10 and the moveable mass 5, e.g. the battery 3, configured to mechanically amplifying the haptic response from the piezo 10 to the user.

The mechanical amplifier system may also include a second lever and/or spring element 124, e.g. a leaf spring, which may be included between the housing 6 and the moveable mass 5 to maintain the contact between the moveable mass 5 and/or tray 120 and the first lever or spring element 123, i.e. spring bias the moveable mass 5 and/or the tray 120 into contact with the first lever and/or spring element 123. If the tray 120 is used, play between the tray 120 and the housing 6 is necessary to ensure the movement, e.g. translation, of the moveable mass 5, e.g. the tray 120 and/or the battery 3. The second lever and/or spring element 124 may be a stand-alone part. The second lever and/or spring element 124 may extend from the tray 120, e.g. be comprised of a resilient or flexible section of the tray 120 configured to extend at an acute angle to the edge of the tray 120 into contact with an inner surface of the housing 6 (see FIG. 23).

The first lever and/or spring element 123 is used to amplify the movement produced by the piezo 10. The first lever and/or spring element 123 may rotate about a pivot axis 125 when the piezo 10 is activated. The pivot axis 125 may be provided by a compliant mechanism, such as a living hinge, or be a mechanical hinge involving two, or more, components. If the pivot axis 125 is provided by a compliant mechanism, it may be part of the first lever and/or spring element 123 and/or the housing 6, and/or other components, e.g. an end of the first lever and/or spring element 123 configured to be received in a groove provided in the housing 6.

The piezo 10 may be in contact with the housing 6 directly or via a first support 126 extending from the frame 121, and in contact with the first lever and/or spring element 123 at a position configured to enable the haptic response of the piezo 10 to be translated via the first lever and/or spring element 123 to the moveable mass 5 and/or the tray 120. The piezo 10 may be supported at an oblique angle, e.g. 10° to 80°, preferably 30° to 60°, to one or more sides of the housing 6 and/or the moveable mass 5, e.g. the battery 3, utilizing the first support 126 in the form of a wedge-shaped support including a surface at the oblique angle. The piezo 10 may be positioned at an angle to clear other components, such as a camera. Depending on the requirements of the application, the piezo 10 may be mounted normal or perpendicular to the movement. A second support 127 may include the pivot axis 125 in the form of a groove for receiving an end of the first lever and/or spring element 123.

Accordingly, the first lever and/or spring element 123 may extend from the second support 127, a first distance into contact with the piezo 10, and then a second farther distance into contact with the moveable mass 5 and/or the tray 120. Thereby, the first lever and/or spring element 123 may comprise a second or a third class lever. The first lever and/or spring element 123 may include a first section configured substantially at the oblique angle providing a contact surface for engaging the piezo 10, and a second longer section configured substantially parallel or at a small acute angle, e.g. 0° to 15°, preferably 5° to 10°, to the edge of the sides of the housing 6 and/or the moveable mass 5, e.g. the battery 3, and/or the tray 120. A third section may be provided at the end of the first lever and/or spring element 123, e.g. at a third angle or the oblique angle, for directing the first lever and/or spring element 123 into contact with and engaging the moveable mass 5, e.g. the battery 3, and/or the tray 120.

When the piezo 10 is activated, a force is applied pushing against the first lever and/or spring element 123, whereby one section, e.g. one end, rotates about pivot axis 125, while another section, e.g. the opposite end, of the first lever and/or spring element 123 pushes against the moveable mass 5 and/or the tray 120, which translates into movement of the moveable mass 5. The second lever and/or spring element 124 repeatedly returns the moveable mass 5 and/or the tray 120 back to the original (first) position from the extended (second) position by applying a biasing force thereto. The movement of the moveable mass 5 is greater than the displacement of the piezo 10 since the first lever and/or spring element 123 acts as a displacement amplifier (mechanical-gain). The acceleration of the moveable mass 5 translates in a force on the housing 6 that will be transmitted to the user in the form of a haptic feedback. To ensure electrical contact between the battery 3 and the PCB 16 even during vibration of the first lever and/or spring element 123, a flexible printed circuit may be used extending therebetween.

The foregoing description of one or more example embodiments has been presented for the purposes of illustration and description. It is not intended to be exhaustive or to limit the invention to the precise form disclosed. Many modifications and variations are possible in light of the above teaching. It is intended that the scope of the disclosure be limited not by this detailed description.

I claim:

1. A wearable or portable device comprising:
a housing;
a display for displaying information and/or a transmitter for transmitting signals;
a PCB for controlling the display and/or the transmitter;
a battery for powering the PCB;
a piezoelectric actuator configured to provide a haptic response; and
a mechanical amplifier between the housing and a moveable mass for mechanically amplifying the haptic response from the piezoelectric actuator to a user,
wherein the moveable mass is configured to move within the housing to provide an amplified haptic response to the user; and
wherein the mechanical amplifier comprises a lever pivotally connected in the housing, and connected to the piezoelectric actuator and to the moveable mass.

2. The device according to claim 1, wherein the moveable mass comprises the battery;
wherein the mechanical amplifier further comprises an upper arm extending from one side of the battery into contact with the lever, which extends from an opposite side of the battery.

3. The device according to claim 1, wherein the lever is pivotally connected to the housing at a pivot point, whereby the moveable mass is suspended by the lever in the housing;
wherein the lever is connected to the piezoelectric actuator at a first distance from the pivot point, and connected to the moveable mass at a second distance from the pivot point; and
wherein the second distance is greater than the first distance.

4. The device according to claim 3, wherein the piezoelectric actuator is between the moveable mass and the pivot point.

5. The device according to claim 3, wherein the lever comprises a resilient material, whereby the lever comprises a flat spring.

6. The device according to claim 5, wherein the lever includes an opening or section reduction between the piezoelectric actuator and the moveable mass configured to tune a spring rate of the lever to enable amplification of an oscillation of the moveable mass.

7. The device according to claim 3, wherein the moveable mass comprises the battery, configured to reciprocate in the housing.

8. The device according to claim 3, wherein the moveable mass comprises the PCB and the battery.

9. The device according to claim 3, wherein the moveable mass comprises the PCB, the battery, and the display.

10. The device according to claim 3, wherein the moveable mass comprises the PCB, the battery, and a cap of the housing.

11. The device according to claim 1, wherein the mechanical amplifier further comprises a spring configured to return the moveable mass back to an initial position.

12. The device according to claim 11, further comprising a tray configured to receive the moveable mass, and configured to reciprocate in the housing.

13. The device according to claim 12, wherein the spring extends from the tray.

14. The device according to claim 11, wherein the lever comprises a resilient material, whereby the lever comprises a flat spring.

15. The device according to claim 11, wherein the piezoelectric actuator is mounted on the housing at an oblique angle to an edge of the housing and/or to an edge of the moveable mass.

16. The device according to claim 15, wherein the lever includes:
    a first end pivotally mounted to the housing;
    a first section parallel to the piezoelectric actuator configured to engage the piezoelectric actuator;
    a second longer section at an angle to the first section extending along the edge of the moveable mass; and
    a second end extending into contact with the moveable mass.

* * * * *